United States Patent [19]

Engström

[11] 4,330,502
[45] May 18, 1982

[54] FLUIDIZED BED REACTOR

[75] Inventor: Folke Engström, Karhula, Finland

[73] Assignee: A. Ahlstrom Osakeyhtio, Noormarkku, Finland

[21] Appl. No.: 159,467

[22] Filed: Jun. 16, 1980

[51] Int. Cl.³ .................. F27B 15/08; F27B 15/16; B01J 8/30; B01J 8/28

[52] U.S. Cl. ................................ 422/142; 34/57 A; 110/245; 422/143; 422/145; 422/146; 431/7; 431/170

[58] Field of Search .............. 422/142, 143, 145, 146; 110/244, 245; 431/2, 7, 170; 34/57 A

[56] References Cited

U.S. PATENT DOCUMENTS

| | | | |
|---|---|---|---|
| 2,838,382 | 6/1958 | Ringgenberg | 422/145 X |
| 2,891,846 | 6/1959 | Knight | 422/145 X |
| 3,370,938 | 2/1968 | Newman et al. | 422/142 X |
| 3,397,657 | 8/1968 | Tada | 110/245 |
| 4,023,280 | 5/1977 | Schora et al. | 422/145 X |
| 4,035,152 | 7/1977 | Yang et al. | 422/143 |
| 4,177,742 | 12/1979 | Uemura et al. | 110/245 X |
| 4,227,488 | 10/1980 | Stewart et al. | 431/7 X |

Primary Examiner—Barry Richman
Attorney, Agent, or Firm—Bucknam and Archer

[57] ABSTRACT

A fluidized bed reactor which is capable of burning material containing incombustible matter which during operation accumulates in the form of large particles in the lower part of the reactor, is provided. A discharge system which causes coarse particles to be discharged in a continuous manner without discharging fine particles or combustible matter is provided. The discharge means comprises a discharge compartment connected to an outlet of the distributor plate of the reactor. An upward flow pipe is centrally disposed in the discharge compartment. Air is supplied to the lower part of the discharge compartment. Coarse particles are withdrawn from the discharge compartment through a discharge pipe. Fine particles are blown back to the reactor through the upward flow pipe.

2 Claims, 1 Drawing Figure

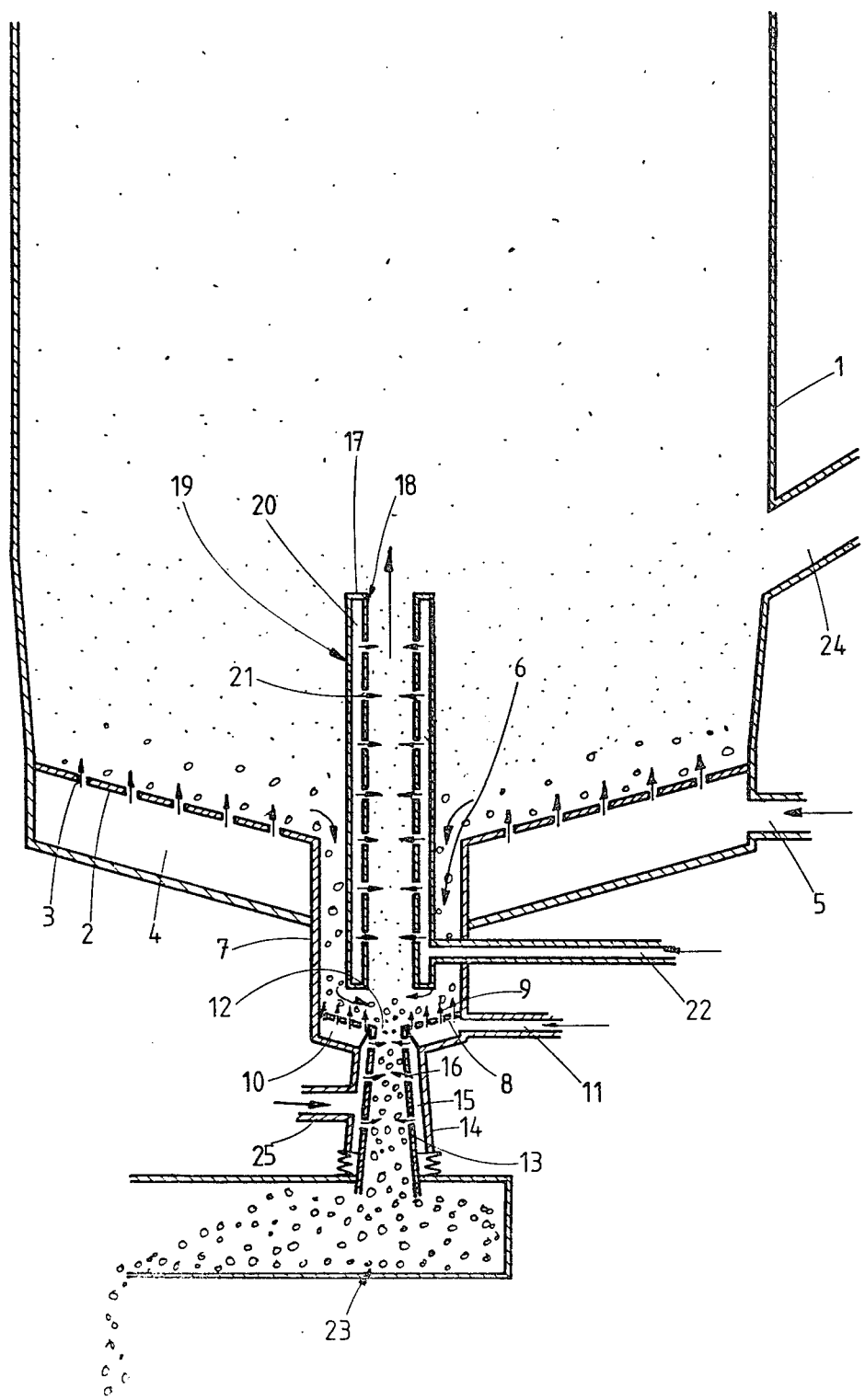

FLUIDIZED BED REACTOR

BACKGROUND OF THE INVENTION

This invention relates to a fluidized bed reactor for burning material containing incombustible matter in a continuously effective manner.

During operation of a fluidized bed reactor large particles usually accumulate in the lower part of the reactor and have to be continually or periodically removed. In spite of the fact that fine particles are entrained by the gas flowing through the reactor, in particular when the fluidized bed reactor is operating at high superficial gas velocities, the material withdrawn from the bottom part contains fine particles. Usually, it also contains combustible matter. The fine particles as well as the combustible material should be returned to the reactor to be utilized there.

An attempt to solve this problem has been made, as described in U.S. Pat. No. 3,397,657, by separating fine particles from the coarse particles of the discharged material by means of pressurized air in an air pipe located exteriorly of the reactor. However, the system has been found to have technological disadvantages, such as low separation rate of fine particles.

SUMMARY OF THE INVENTION

It is the primary object of the present invention to provide a fluidized bed reactor which is capable of burning material containing incombustible matter which during operation accumulates in the form of large particles in the lower part of the reactor and causes them to be discharged in a continuous manner without discharging fine particles and combustible matter.

It is another object of the invention to provide means for circulating the material in a fluid bed reactor.

It is yet another object of the invention to provide means for supplying gas to the innermost part of a fluidized bed reactor a distance apart from the distributor plate.

A further object of the invention is to cool the material withdrawn from the reactor.

According to the invention a fluidized bed reactor is provided with a discharge system which comprises a discharge compartment connected to an outlet in the distributor plate. An upward flow pipe is disposed in the discharge compartment. Air is supplied to the lower part of the discharge compartment. Coarse particles are withdrawn from the discharge compartment. Fine particles are returned from the discharge compartment to the reactor through the upward flow pipe.

According to a preferred embodiment of the invention the upward flow pipe is double-walled and air is caused to flow through the space between the walls of the pipe, to be introduced into the pipe, and to flow upwards into the inner part of the reactor.

BRIEF DESCRIPTION OF THE DRAWING

In the drawing, the sole FIGURE is a vertical section through the lower part of a fluidized bed reactor according to the invention.

DESCRIPTION OF A PREFERRED EMBODIMENT

In the drawing, reference 1 is a housing forming a combustion chamber to a fluidized bed reactor, and a first distributor plate 2 provided with a plurality of orifices 3 for distributing fluidization gas to the reactor, is disposed in the lower part of the reactor extending substantially transversely of the housing. Beneath the distributor plate 2 there is a first wind box 4, to which gas, such as air, can be supplied through an air pipe 5. Reference 6 is an outlet opening in the distributor plate 2 and reference 7 a discharge compartment of substantially constant cross-sectional area connected to the opening 6. In the bottom part of the discharge compartment there is a second distribution plate 8 provided with a plurality of orifices 9. Beneath the distributor plate 8 there is a second wind box 10 to which gas, such as air, can be supplied through an air pipe 11. Reference 12 is an outlet opening in the distributor plate 8 and reference 13 a discharge pipe connected to the outlet opening 12. The discharge pipe is surrounded by a casing 14 in order to form a gas space 15 to which gas, such as air, is supplied through an air pipe 25. The discharge pipe is provided with openings 16 which allow gas to be introduced into it. An upward flow pipe 17 is disposed centrally in the discharge compartment a distance apart from the upper surfaces of the second distributor plate, and extends upwardly through the outlet of the first distributor plate into the housing 1. The flow pipe 17 is formed by an inner wall 18 and an outer wall 19 to constitute an air space 20 between them. The inner wall is provided with a plurality of openings 21. Gas, such as air, can be supplied to the pipe through an air pipe 22. The lower end of the discharge pipe is connected to an exhaust pipe 23, which is provided with vibrators or screw feeders to discharge material from the exhaust pipe.

The apparatus described above is understood to work in the following manner.

The material to be burned is supplied to the lower part of the fluidized bed reactor through feed pipe 24 and flue gases are exhausted from it at its upper end (not shown in the drawing). Fine particles entrained by the flue gases are separated and returned to the reactor in a manner known per se. Pressure air is introduced into the reactor through orifices 3 in the first distributor plate 2 to fluidize the material in the reactor and supply combustion air.

When the combustion process is kept going on, fine particles are entrained by the gas flowing through the reactor and carried off, but larger particles, for instance such as are formed by agglomeration of ash, which are too massive to be entrained, are retained at the bottom part of the reactor. The coarse particles move along the inclined surface of the distributor plate 2 towards the outlet 6 and flow down into the discharge compartment 7. The material flowing down between the wall of the discharge compartment contains some amount of fine particles and may also contain combustible matter. Pressure air supplied through the orifices 9 in the distributor plate 8 flows upwardly through the discharged material, thereby supplying combustion air to perform afterburning of combustible matter. In the bottom part of the discharge compartment the material flows along the preferably inclined surface of the distributor plate 8, towards the outlet 12, whereby the air that is caused to flow through it and to be passed upwardly through the flow pipe 17 separates the fine particles which are carried off by the air, from the discharged material. In this way fine particles are returned to the inner part of the reactor.

Air is also supplied to the space between walls 18 and 19 of the upward flow pipe to enhance the upward flow and to cool the pipe. In this manner air can be supplied to the innermost part of the reactor.

The coarse particles flow through the discharge pipe 13 to the exhaust pipe 23 to be finally discharged. The discharged material is cooled by conduction of heat to the wall 19 of the upward flow pipe and by the air supplied through the openings 16 of the discharge pipe.

The orifices 9 in the second distributor plate 8 may be made larger in size or increased in number toward the outlet opening 12, thereby enabling more air to be supplied through the inner portion of the distributor plate to effectively blow away fine particles. It is also possible to divide the wind box 10 in two parts, an outer part and an inner part, both connected to separate supply of pressurized air to enable better control of the recirculation of fine particles.

What is claimed is:

1. A fluidized bed reactor comprising a housing forming a combustion chamber and containing therein a first distributor plate provided with a plurality of orifices and comprising a first outlet opening, a downwardly extending discharge compartment connected at its upper end to said first outlet opening and provided with a second distributor plate disposed therein at its lower end, said second distributor plate having a plurality of orifices therein and comprising a second outlet opening, an upward flow pipe disposed centrally in the discharge compartment a distance apart from the upper surface of said second distributor plate and from the wall of said discharge compartment and extending upwardly into said combustion chamber through said first outlet opening, means for supplying gas to a first wind box under said first distributor plate, and means for supplying gas to a second wind box located under said second distributor plate, wherein said upward flow pipe is a double-walled pipe, the inner wall of which is provided with openings, means for supplying gas to the space between the walls, a discharge pipe is connected to said second outlet opening, said discharge pipe is provided with openings in its wall and is surrounded by a casing forming a gas space which is connected to a supply source of gas.

2. The bed reactor according to claim 1 which comprises an inlet for the material to be combusted in the lower part thereof and an outlet for the exhaust gases at the top thereof.

* * * * *